No. 897,220.

C. W. MICHAEL.
CORN PLANTER.
APPLICATION FILED JAN. 13, 1908.

PATENTED AUG. 25, 1908.

2 SHEETS—SHEET 1.

No. 897,220. PATENTED AUG. 25, 1908.
C. W. MICHAEL.
CORN PLANTER.
APPLICATION FILED JAN. 13, 1908.
2 SHEETS—SHEET 2.
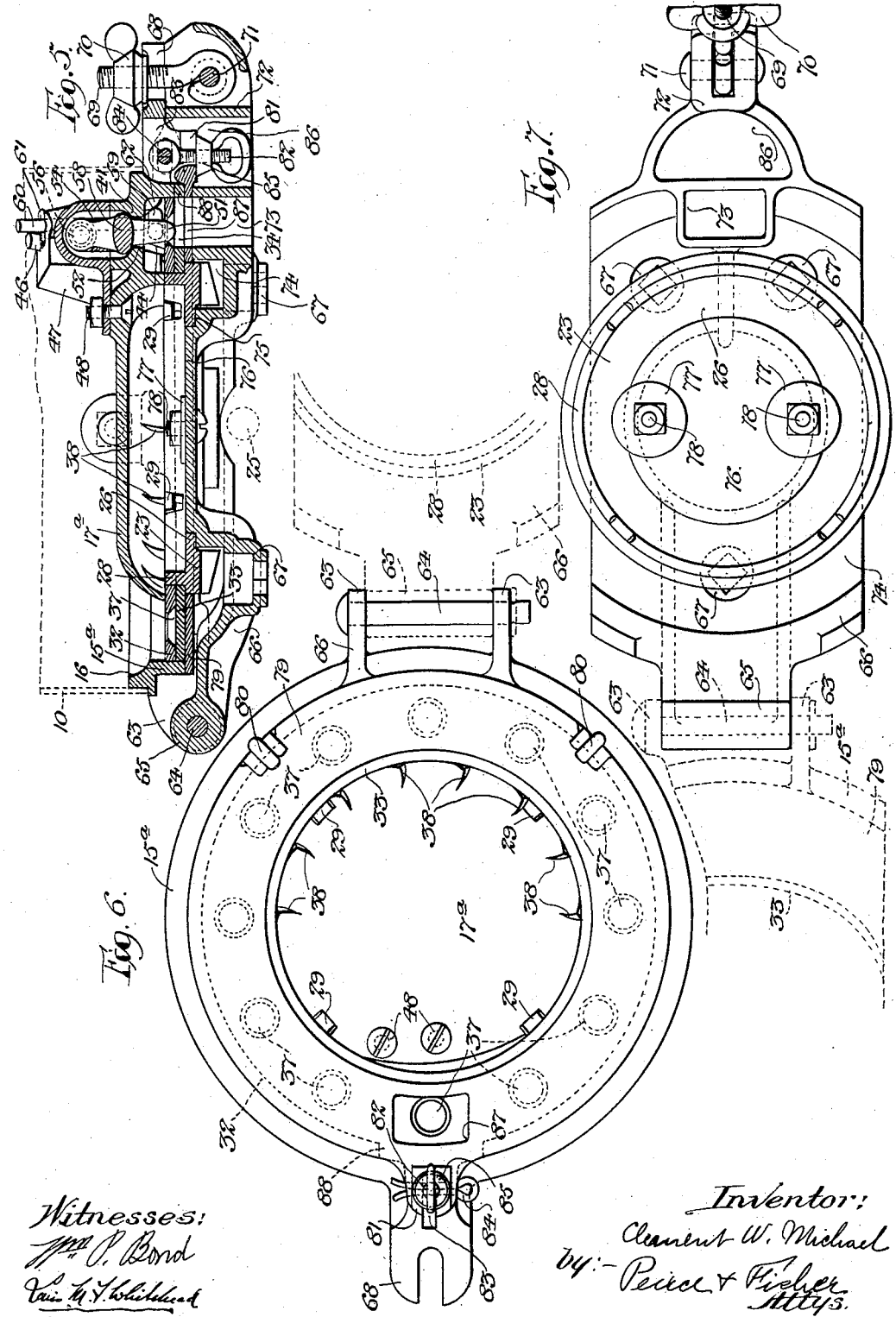

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

CORN-PLANTER.

No. 897,220.        Specification of Letters Patent.        Patented Aug. 25, 1908.

Original application filed July 11, 1906, Serial No. 325,571. Divided and this application filed January 13, 1908. Serial No. 410,468.

*To all whom it may concern:*

Be it known that I, CLEMENT W. MICHAEL, a citizen of the United States, and a resident of Racine, county of Racine, and State of Wisconsin, have invented certain new and useful Improvements in Corn-Planters, of which the following is a specification.

The invention relates to corn planters and more particularly to the mechanism for delivering the kernels one at a time from the seed box or hopper, the seed being accumulated one at a time by suitable valve mechanism for hill planting but allowed to fall freely from the seed delivery mechanism in drill planting.

The invention seeks to improve the seed delivery mechanism to insure the accurate and proper delivery of the seed from the seed can or hopper and consists in the features of construction, combinations and arrangements of parts hereinafter set forth, illustrated in the accompanying drawings and more particularly pointed out in the appended claims.

The present application is a division of a prior application filed by me July 11, 1906, Serial No. 325,571.

In the drawings, Figure 1 is a plan view of the seed mechanism in the bottom of the seed can or hopper, the body of the can or hopper being shown in section. Fig. 2 is a cross-section on line 2—2 of Fig. 1. Fig. 2$^b$ is a partial cross-section similar to Fig. 2 but illustrating the use of a different seed-plate. Fig. 3 is an inverted plan view of the cap plate or cover that extends over the seed plate. Fig. 4 is a detail section on line 4—4 of Fig. 3. Fig. 5 is a section similar to Fig. 2 illustrating a modified form of the seeding mechanism. Fig. 6 is an inverted plan view of the seeding mechanism shown in Fig. 5. Fig. 7 is a plan view of the support for the seeding mechanism shown in Figs. 5 and 6.

In the form shown in Figs. 1 to 4 inclusive, the seedbox or hopper 10 is provided with a bottom portion 11 of cast metal. The seedbox bottom 11 is provided on one side with a pair of lugs 12 through which extend a pivot bolt 13 which serves to pivotally connect the seedbox to the frame of the machine. At the opposite side, the seedbox bottom is provided with a perforated lug 14 for receiving a bolt to connect the seedbox to the frame at this point. By removing the bolt through the lug 14 the seedbox may be swung about the pivot pin 13.

The bottom 11 of the seedbox or hopper is provided at its edge with an upwardly-projecting flange 15 which fits within the body portion of the hopper and which is preferably cut away or beveled at its upper portion, as indicated at 16. A cap or cover plate 17 is mounted upon a central raised portion 18 of the hopper bottom and the outer, downturned edge of this cap or cover plate forms, with the flange 15 of the hopper bottom, an annular feedway through which the kernels of corn are delivered to the cells of the seed plate that rotates below the cap plate. A central stud or bolt 19 extends through the raised portion 18 of the hopper bottom and through the cap plate 17. A winged nut 20 upon the upper end of the bolt 19 removably holds the cap plate or cover 17 in position. A piece 21 is held in place by a bolt 22 beneath the lower headed pin of the stud 19 so that the latter cannot fall from position when the thumbnut 20 is removed.

The seed plate in the hopper bottom is driven by an annular beveled gear 23 that is arranged within an annular groove or recess 24 in the hopper bottom. This gear is driven in the usual manner from a beveled pinion upon a shaft 25 that is journaled in the frame of the machine beneath the seed can or hopper. The annular gear 23 is provided with an inwardly-projecting, horizontal flange 26 that engages a rabbet or shoulder 27 in the hopper bottom so that the gear is rotatably sustained in position. The gear is also provided adjacent its outer edge with an upwardly-projecting flange 28. The different annular seed plates employed are held in position between the hopper bottom 11 and the cover or cap plate 17 and between the upright flange 15 of the hopper bottom and the upright flange 28 of the drive gear 23. The seed plates are provided with inwardly-projecting lugs 29 (see Fig. 2) that engage notches in the vertical flange 28 of the gear so that the seed plates are connected to rotate with the gear.

The hopper bottom is designed to receive plates in which the cells are adapted either for containing single kernels or for containing sufficient kernels to form a full hill. The thick seed plate 30 shown in Fig. 2ᵇ, takes up all the space between the cover plate and the bottom of the hopper, and the seed cells 31 therein are of sufficient size to contain the desired number of kernels to form a hill. Where the seed is to be accumulated, one at a time as the machine travels between rows, the thin seed plate 32 (see Figs. 2 and 4) is employed. To hold the thin seed plate 32 in proper position against the lower edge of the cap plate or cover 17, an annular space plate 33 is interposed between the seed plate 32 and the hopper bottom 11. This spacing plate is provided with a discharge opening 34 end with a downwardly-projecting part 35 that extends within the discharge-opening 36 of the hopper bottom and serves to hold the spacing plate accurately in position and also holds it against revolution.

The cells 37 of the seed plate 32 are arranged to hold single kernels flatwise and are preferably round, as shown, and conical in form, that is to say, the cells are slightly larger at their lower portions than they are at their upper portions and the upper edge is preferably slightly chamfered or beveled off (see Fig. 4). To accurately charge the cells of the seed plate with corn, the cover or cap plate 17 is provided at its periphery with a series of serrations or teeth 38, the points of which extend closely adjacent the inner edges of the seed cells 37. The forward abrupt faces 39 of the teeth 38 are radially disposed, while the outer curved faces or edges 40 are forwardly and outwardly inclined in the direction of rotation of the seed plate. The seed plates rotate in the direction of the arrow, shown in Fig. 1, and the upper surfaces of the seed plate 32, and also of the spacing plate 33, are smoothly finished and polished. As the seed plate 32 rotates, the kernels within the seed groove above the cells will be pushed outwardly by the inclined edges 40 into the cells so that the latter will be accurately and uniformly charged with seed. The cells are of such shape that, when once charged with seed, it is difficult for the seed to escape therefrom, except of course, in the proper manner, i. e., through the discharge opening 36.

A peculiar form of cut-off is provided which will effectually prevent the discharge of more than one kernel of corn from any of the cells of the thin plate 32. The cap plate or cover 17 is provided intermediate its upper and lower edges and at one portion of its periphery, with an outwardly-projecting supporting flange 41, the outer edge of which engages a suitable seat 42 in the hopper bottom (see Fig. 2). This flange 41 is also arranged between a pair of lugs 43 (see Fig. 1) in the hopper bottom, so that the cap plate is held against twisting. The flange 41 is spaced above the seed plate, as most clearly shown in Figs. 2 and 4, so that a passage-way 44 is formed above the cells 37 of the plate. The forward end of this passage-way is blocked by a cut-off 45 which is arranged within a slot or guide-way in the flange 41, and which is provided with a stem 46 extending upwardly through a casing 47. This casing is arranged over the flange 41 of the cap plate and is secured to the latter by screw-bolts 48. A spring 49 coiled about the stem 46 holds the cut-off 45 in normal position with a stop-lug 50 thereon in engagement with the flange 41. The cut-off 45 is provided with a beveled lower edge that is held snugly into engagement with the seed plate and the faces of the cut-off which form this beveled edge, are ground and smoothly polished and are inclined upwardly and away from the seed plate. The cut-off itself is nearly upright but is slightly inclined from a perpendicular to the face of the seed plate and in the direction in which the plate is moving. The cut-off, instead of being pivoted as in the ordinary construction, is accurately guided by the supporting flange 41 to shift longitudinally in a straight path and is slightly inclined from the perpendicular to the seed plate. This peculiar arrangement of cut-off is found to operate with great accuracy for deflecting seeds in excess from the cells 37 and effectually accomplishes its work without cracking or breaking the kernels.

A seed-ejector or expeller 51 is arranged in a cut-away space or slot 52 in the flange 41 and over the discharge opening 36. This expeller is mounted to swing on pintles 53 that are suitably journaled in sockets formed upon the flange 41. A cushion spring 54 interposed between a lug on the flange 41 and a lug 56 on an arm 57 of the seed ejector or expeller, serves to project the latter, into the cells 37 as they pass over the discharge opening. To limit the movement of the seed-expeller, it is provided with an arm 58 that is arranged to strike the flange 41 when the expeller enters one of the cells of the seed plate. A secondary cut-off or curved guide-finger is arranged between the primary cut-off 45 and the seed-expeller 51. This secondary cut-off or guide finger 59 is held just above the upper surface of the seed plate and is provided at its forward end with an upwardly and rearwardly inclined stem 60 that is swiveled in the flange 41 and in the casing 47. It is held in position as shown, by a cotter-pin 61 extending through an opening in the stem 60 above the casing 47. As shown in Figs. 2 and 3 the forward end of the guide-finger is arranged against a lug 62 formed on the flange 41 at the outer side of the passage-way 44, where the rear end of the finger is arranged in front of the seed-expeller 51. The arrangement is such that any seed in excess which may pass the primary cut-off 45 will be deflected by the guide-finger or secondary cut-off 59 past the seed-expeller and will move through the passage 44 back into the seed hopper. In prior seeding mechanisms which accumulate the seed one at a time, the seed plate is usually provided with cells at its edge and which are arranged to receive the kernels edgewise only. Such an arrangement requires that the seed be very carefully selected, since round or irregular-shaped kernels cannot enter the cells. The present arrangement of thin plate in which the cells are arranged to receive the seed flatwise, together with the present improved construction of serrated or toothed cover plate, and with the improved cut-off mechanism set forth, has been found in practice to operate with great accuracy in accumulating the seed one at a time and does not require great care in the selection of the seed employed. Moreover, when desired a thick plate having cells of sufficient size to hold an entire hill of corn may be substituted for the thin plate.

In the modification shown in Figs. 5, 6 and 7, the improvements above set forth are applied to the so-called "movable bottom seed-hopper", i. e., one in which the plate may be removed and changed from the bottom of the hopper without necessitating the removal of the seed therein. The seed plates, drive gear and cut-off mechanism are entirely similar to that before described. The cap plate 17ª is also of similar construction but is formed in one piece with the annular flange 15ª of the hopper bottom. This flange is provided with a pair of outwardly-projecting lugs 63 through which extend a pivot-pin 64. This pin also extends through a sleeve or lug 65 upon a support or casting 66 upon which the hopper rests. In this way the hopper is hinged to the support 66, which support is connected by bolts extending through a box 67 thereon to the planter frame. At a point opposite its hinge, the hopper bottom is provided with a horizontally extending, slotted lug 68 and an eye-bolt 69 having a winged thumb nut 70 is arranged to engage the slotted lug 68 and hold the seed hopper in place. The eye-bolt 69 is pivoted upon a cross-pin 71 that is arranged in a forked lug 72 on the supporting casting 66. The supporting casting 66 is provided with a discharge opening 73 and with an annular recess 74 within which the beveled drive gear 23 is arranged. The inwardly-projecting horizontal flange 26 of the drive gear in this instance engages a suitable rabbet or shoulder 75 in a raised central portion 76 of the supporting casting 66. The drive gear 23 is thus free to rotate upon the support 66 but is held against displacement therefrom by two washers 77 (see Figs. 5 and 7) which are secured to the raised central portion 76 of the support 66 by bolts 78 and which overlap the inner edge of the drive gear. The seed plate 32 as before is provided with inwardly-projecting lugs 29 that engage notches in the upstanding flange 28 of the drive gear 23.

The seed plate 32 and the spacing plate 33 are held in place by a suitable retaining plate 79 that is removably secured to the bottom of the hopper. In the form shown, the retaining plate 79 is arranged to engage a pair of lugs 80 on the hopper bottom (see Fig. 6) and is provided at one side with a slotted lug 81 that is adapted to be engaged by an eye-bolt 82. The upper end of this eye-bolt is arranged within a slot 83 in the lug 68 on the hopper bottom and is swiveled thereto upon a cross-pin 84. The lower end of the pin is provided with a thumb-nut 85 by which the retaining plate 79 is removably held in position. In the working position of the parts, the retaining bolt 82 and the nut 85 thereon extend within a recess 86 in the offset lug 72 of the supporting casting 66.

The retaining plate 79 is of course provided with a discharge opening 87 that coincides with the discharge opening 34 of the spacing plate 33. The spacing plate, in this form, is provided with an offset lug 88 (see Fig. 5 and in dotted lines in Fig. 6) which engages a notch in the seedbox bottom 15ª to hold the spacing plate against revolution. If desired, the seed-plate 32 and spacing-plate 33 in this form may be removed and replaced by a thick plate, such as shown at 30 in Fig. 2ᵇ, and having cells of sufficient size for each to hold a hill of corn.

To effect the removal and change of plates in the form shown in Figs. 5, 6 and 7, the wing-nut 70 on the eye-bolt 69 is first loosened and swung outwardly so that the hopper and hopper bottom may be swung back upon the pivot-bolt 64 to the inverted position shown in Fig. 6. When the hopper is swung back in this manner, the seed plate is disconnected from the beveled gear 23 which remains in position upon the support 66. Then by loosening the nut 85 on the bolt 82 the latter may be shifted to release the retaining plate 79. On the removal of the retaining plate, the spacing plate 33 and the seed plate 32 may be removed and a seed plate equal in thickness to both of these plates, such as shown at 30 in Fig. 2ᵇ may be substituted therefor. The retaining plate 79 will then be placed in engagement with the lugs 80 and clamped in position by the thumb-nut 85 on the bolt 82. The seedbox is then swung back on top of the support 66 so that the lugs 29 of the seed plate reëngage the notches of the flange 28 on the gear 23. The hopper is then clamped in this operative position by means of the thumb-nut 70 on the bolt 69.

It is obvious that numerous changes may be made in the details of structure and arrangements of parts without departure from the essentials of the invention.

Having described my invention, what I claim as new and desire to secure by Letters Patent, is:—

1. In a corn planter, the combination with a seed hopper, of a serrated cover plate secured to the bottom of said hopper, a seed plate held in place between the bottom of said hopper and said cover plate, said seed plate having cells adapted to receive single kernels flatwise, said cover plate having serrations or teeth the points of which extend adjacent the inner edges of the cells of said seed plate and the outer edges of which teeth are inclined outwardly and forwardly in the direction of rotation of the seed plate, a primary cut-off adjacent the discharge opening of said hopper, means for supporting and guiding said cut-off in a straight path slightly inclined from the perpendicular to the face of the seed plate, a seed expeller and a secondary cut-off or guide-finger interposed between said primary cut-off and said seed expeller, substantially as described.

2. In corn planters, the combination with a seed hopper having a discharge opening, of a seed plate in the bottom of said hopper having cells arranged to receive single kernels flatwise, a cap or cover above said seed plate having inclined teeth extending adjacent said cells, a spacing plate between the bottom of said hopper and said seed plate, said spacing plate and said seed plate having polished upper surfaces, a cut-off adjacent said discharge opening and a support for said cut-off having means for guiding the same in a straight path slightly inclined to a perpendicular to said seed plate, substantially as described.

3. In corn planters, the combination with a seed hopper having a discharge opening, of a seed plate in the bottom of said hopper having cells arranged to receive single kernels flatwise, a cap or cover above said seed plate having inclined teeth extending adjacent said cells, a spacing plate between the bottom of said hopper and said seed plate, said spacing plate and said seed plate having polished upper surfaces, a cut-off adjacent said discharge opening, means for supporting and guiding said cut-off in a straight path slightly inclined to a perpendicular to the seed plates, a seed expeller and a secondary cut-off or guide finger for deflecting seed in excess in said cells past said seed expeller, substantially as described.

4. In corn planters, the combination with the seed hopper having a discharge opening, of a seed plate and a spacing plate in the bottom of said hopper, a cover overlapping said seed plate having teeth or serrations, the outer points of which lie adjacent the cells of said seed plate, a primary cut-off, means for supporting and guiding said cut-off in a straight path slightly inclined from a perpendicular to the face of the seed plate, a seed expeller and a guide finger interposed between said primary cut-off and said expeller, substantially as described.

5. In a corn planter, the combination with a seed hopper, of a support below said hopper whereon the same is movably mounted, a cap-plate secured to the bottom of said hopper, a seed-plate below said cap plate, an annular retaining plate removably secured to the bottom of said hopper, an annular spacing-plate held in position between said retaining plate and said seed-plate, and a drive gear mounted on the support below said hopper and having parts extending upwardly through said annular retaining and spacing plates and detachably engaging said seed plate, substantially as described.

6. In a corn planter, the combination with a corn hopper movably mounted on a suitable support, of a serrated cover plate secured to the bottom of said hopper, a seed plate below said cover, a retaining plate removably secured to the bottom of said hopper, a spacing plate between said retaining plate and said seed plate, a primary cut-off adjacent the discharge opening of said hopper, means for supporting and guiding said cut-off in a straight path slightly inclined from a perpendicular to the face of the seed plate, a seed expeller and a secondary cut-off or guide finger interposed between said primary cut-off and said seed expeller, substantially as described.

7. In a corn planter, the combination with a hopper hinged to a suitable support, of a rotating seed plate in the bottom of said hopper, a retaining plate, means for locking said retaining plate in position on the bottom of said hopper, a cover over said seed plate, a primary cut-off adjacent the discharge opening of said hopper, a seed expeller and a secondary cut-off or guide finger interposed between said primary cut-off and said seed expeller, substantially as described.

8. In a corn planter, the combination with a seed hopper movably mounted in position, of a serrated cover plate secured to the bottom of said hopper, a retaining plate removably secured to the bottom of said hopper, a seed plate held in place between said retaining plate and said cover plate, said seed plate having cells adapted to receive single kernels flatwise, said cover plate having serrations or teeth the points of which extend adjacent the inner edges of the cells of said seed plate and the outer edges of which are inclined outwardly and forwardly in the direction of the rotation of the seed plate, a primary cut-off adjacent the discharge opening of said hopper, means for supporting and guiding said cut-off in a straight path slightly inclined from a perpendicular to the face of the seed plate, a seed expeller and a secondary cut-off or guide finger interposed between said primary cut-off and said seed expeller, substantially as described.

9. In a corn planter, the combination with a hopper bottom movably mounted in position, a cover plate secured to said hopper bottom, a retaining plate removably locked in position upon the bottom of said hopper, a seed plate held in position between said retaining plate and said cover plate, a primary cut-off adjacent the discharge opening of said hopper, means for supporting and guiding said cut-off in a straight path slightly inclined from a perpendicular to the face of the seed plate, a seed expeller and a secondary cut off or guide finger interposed between said primary cut-off and between said seed expeller, substantially as described.

CLEMENT W. MICHAEL.

Witnesses:
 PERCY ROBERT BORMAR,
 ROY WINFIELD MARTIN.